US010067358B2

(12) United States Patent
Aono et al.

(10) Patent No.: US 10,067,358 B2
(45) Date of Patent: Sep. 4, 2018

(54) IMAGE STABILIZATION MECHANISM AND IMAGING DEVICE WITH THE SAME

(71) Applicant: Panasonic Intellectual Property Management Co., Ltd., Osaka (JP)

(72) Inventors: Hiroki Aono, Osaka (JP); Dai Shintani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/425,070

(22) Filed: Feb. 6, 2017

(65) Prior Publication Data
US 2017/0261762 A1 Sep. 14, 2017

(30) Foreign Application Priority Data
Mar. 11, 2016 (JP) .................. 2016-048827

(51) Int. Cl.
*G02B 27/64* (2006.01)
*H04N 5/232* (2006.01)
*H04N 5/225* (2006.01)

(52) U.S. Cl.
CPC ......... *G02B 27/646* (2013.01); *H04N 5/2253* (2013.01); *H04N 5/23258* (2013.01); *H04N 5/23287* (2013.01)

(58) Field of Classification Search
CPC .. G02B 27/646; G02B 27/64; H04N 5/23258; H04N 5/23287; H04N 5/2328; H04N 5/23248
See application file for complete search history.

(56) References Cited

U.S. PATENT DOCUMENTS

| 3,756,687 | A | * | 9/1973 | Shin | G01C 19/02 359/557 |
| 6,035,131 | A | * | 3/2000 | Washisu | G02B 27/646 396/55 |
| 6,064,827 | A | * | 5/2000 | Toyoda | G02B 27/646 396/55 |
| 9,618,770 | B2 | * | 4/2017 | Park | G02B 27/646 |
| 2007/0257989 | A1 | * | 11/2007 | Shirono | H04N 5/2253 348/208.99 |
| 2009/0002502 | A1 | * | 1/2009 | Shirono | G03B 5/00 348/208.99 |
| 2009/0091720 | A1 | * | 4/2009 | Bertele | F15B 15/10 355/52 |

(Continued)

FOREIGN PATENT DOCUMENTS

JP 2012-198379 10/2012

*Primary Examiner* — Twyler Haskins
*Assistant Examiner* — Akshay Trehan
(74) *Attorney, Agent, or Firm* — Wenderoth, Lind & Ponack, L.L.P.

(57) ABSTRACT

An image stabilization mechanism includes: a sensor holder unit configured to hold an image sensor; a rear frame; a front frame; a first ball; a second ball; and a cylinder unit configured to press the first ball against the sensor holder unit. The cylinder unit has a cylinder on the rear frame so that an axial direction thereof is parallel to an optical axis direction, a piston movably positioned in the cylinder, and a spring configured to urge the piston toward the sensor holder unit. The first ball is between an end surface of the piston and the sensor holder unit.

8 Claims, 13 Drawing Sheets

(56) References Cited

U.S. PATENT DOCUMENTS

| | | | |
|---|---|---|---|
| 2010/0220206 A1* | 9/2010 | Nagano | G02B 27/646 348/222.1 |
| 2012/0127445 A1* | 5/2012 | Ebihara | G02B 27/646 355/67 |
| 2014/0028862 A1* | 1/2014 | Kawai | H04N 5/23287 348/208.11 |
| 2015/0296112 A1* | 10/2015 | Park | H04N 5/2257 348/208.7 |
| 2016/0219222 A1* | 7/2016 | Heo | H04N 5/23287 |

* cited by examiner

IMAGE STABILIZATION MECHANISM AND IMAGING DEVICE WITH THE SAME

BACKGROUND

1. Technical Field

The present disclosure relates an image stabilization mechanism, and an imaging device with the image stabilization mechanism.

2. Description of the Related Art

Unexamined Japanese Patent Publication No. 2012-198379 discloses an image stabilization mechanism (image blur correction device).

As shown in FIG. 15, this image stabilization mechanism has fixed member 2540, and moving member 2350 holding an optical lens. Moving member 2350 is disposed to oppose to fixed member 2540 through a plurality of rolling balls so as to be movable in parallel to fixed member 2540. The image stabilization mechanism further has a plurality of tension springs 2600 which are inserted at a plurality of locations between a periphery of moving member 2350 and a periphery of fixed member 2540 so as to press moving member 2350 against fixed member 2540. Tension springs 2600 urge moving member 2350 so that moving member 2350 is pressed against fixed member 2540 to suppress rattling between moving member 2350 and fixed member 2540.

In the image stabilization mechanism disclosed by Unexamined Japanese Patent Publication No. 2012-198379, a displacement of moving member 2350 relative to fixed member 2540 in a plane perpendicular to the optical axis causes each tension spring 2600 to expand in an oblique direction, so that restoring force Fr acts on moving member 2350 in a direction toward a reference state of the moving member. Accordingly, when driving force Fm1 or Fm2 is applied to moving member 2350, an actual driving force against moving member 2350 will increase or decrease due to restoring force Fr, so that moving member 2350 cannot appropriately be moved.

SUMMARY

The present disclosure provides an image stabilization mechanism that is capable of suppressing rattling of a component holder which holds an optical component, and is also capable of moving the component holder appropriately in a plane perpendicular to an optical axis.

An image stabilization mechanism in accordance with the present disclosure includes: a component holder that holds an optical component; a first frame disposed on one side of the component holder in an optical axis direction; a second frame disposed on the other side of the component holder in the optical axis direction and fixed to the first frame; a first ball rollably inserted between the first frame and the component holder; a second ball rollably inserted between the second frame and the component holder; and an pressing mechanism provided on the first frame to press the first ball against the component holder.

The pressing mechanism has a cylinder provided on the first frame so that its axial direction is parallel to the optical axis direction, a piston movably provided in the cylinder, and an urging member that urges the piston toward the component holder.

The first ball is disposed between an end surface of the piston and the component holder.

According to an image stabilization mechanism of the present disclosure, it is possible to suppress rattling of the component holder that holds the optical component, and to appropriately move the component holder in a plane perpendicular to the optical axis.

DETAILED DESCRIPTION

Hereinafter, exemplary embodiments will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the description.

Also, it should be noted that the inventors intend to provide the following description and the accompanying drawings so as to allow any person skilled in the art to fully understand the present disclosure, and not intend to limit the subject matter described in the claims by those description and drawings.

Hereinafter, an image stabilization mechanism and an imaging device of the present disclosure will be described in detail.

First Exemplary Embodiment

A first exemplary embodiment will be described with reference to the drawings.

1. Configuration

The structure of a digital camera in accordance with the present exemplary embodiment will be explained with reference to FIG. 1.

Figure 1:
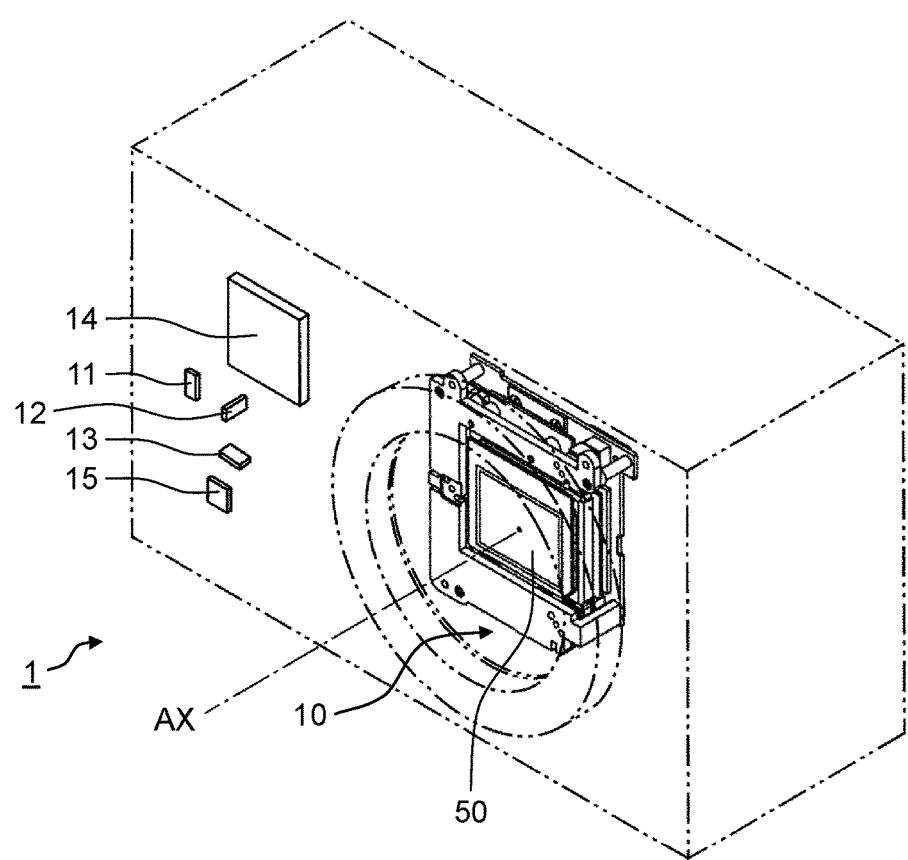
FIG. 1 is a see-through perspective view of a digital camera with an image stabilization mechanism in accordance with a first exemplary embodiment.

FIG. 1 is a see-through perspective view of a digital camera with an image stabilization mechanism in accordance with a first exemplary embodiment.

As shown in FIG. 1, digital camera 1 has image sensor 50. Image sensor 50 captures an object image formed by an optical system (not shown) composed of one or plural lenses. An image data produced by image sensor 50 is subjected to various processes by controller 14, image processor (not shown), and the like, and stored in a storage medium (not shown) such, for example, as a memory card. Image sensor 50 may, for example, be a CMOS (Complementary Metal Oxide Semiconductor) sensor or a CCD (Charge Coupled Device) sensor. Image sensor 50 is an example of an optical component.

Digital camera 1 has angular acceleration sensors 11, 12 and 13, acceleration sensor 15, and image stabilization mechanism 10. Angular acceleration sensor 11 detects an angular acceleration of a camera shake in a roll direction. Angular acceleration sensor 12 detects an angular acceleration of the camera shake in a pitch direction. Angular acceleration sensor 13 detects an angular acceleration of the camera shake in a yaw direction. Acceleration sensor 15 detects accelerations in an X-axis direction and a Y-axis direction. Here, the X-axis is an axis which is perpendicular to an optical axis AX direction and, when viewed from the object side in the optical axis AX direction, extends in lateral directions so that the rightward direction is positive. Also, the Y-axis is an axis which is perpendicular to the optical axis AX direction and, when viewed from the object side in the optical axis AX direction, extends in vertical directions so that the upward direction is positive.

Image sensor 50 is mounted on image stabilization mechanism 10 fixed to a chassis of digital camera 1.

Image stabilization mechanism 10 is driven by controller 14 based on the angular accelerations in the yaw, pitch and roll directions detected biangular acceleration sensors 11, 12 and 13 and the accelerations in the X-axis direction and the Y-axis direction detected by acceleration sensor 15. Controller 14 moves image sensor 50 in a plane perpendicular to the optical axis so that a blur of an image on image sensor 50 caused due to a shake of the camera chassis is cancelled.

Figure 2:
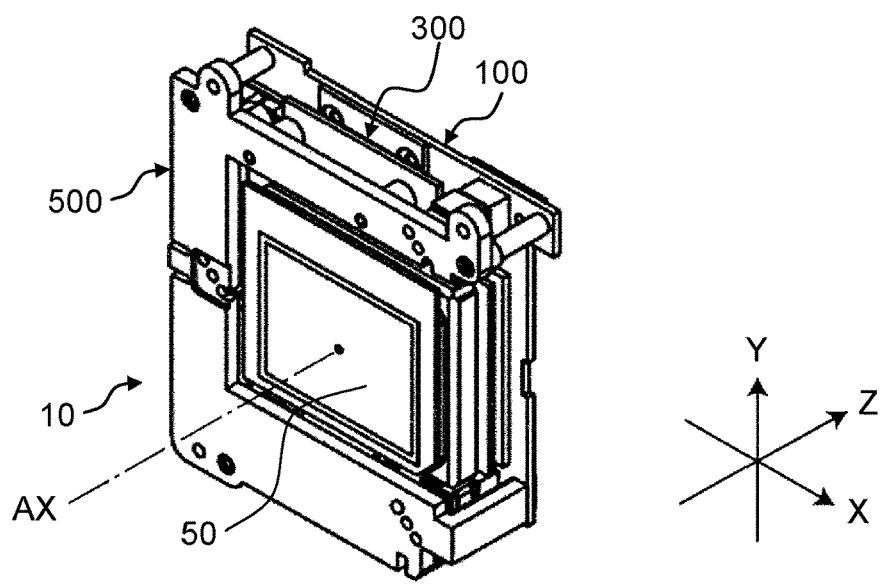
FIG. 2 is a perspective view of a front side of the image stabilization mechanism in which an image sensor is mounted.
Figure 3:
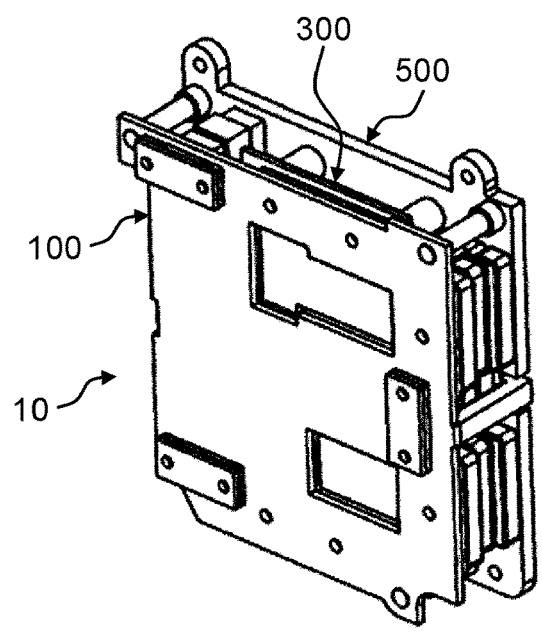
FIG. 3 is a perspective view of a back side of the image stabilization mechanism in which the image sensor is mounted.

FIG. 2 is a perspective view of a front side of image stabilization mechanism 10 in which image sensor 50 is mounted. FIG. 3 is a perspective view of a back side of image stabilization mechanism 10 in which image sensor 50 is mounted.

As shown in FIG. 2 and FIG. 3, sensor holder unit 300 is a unit that holds image sensor 50. Sensor holder unit 300 is disposed between rear frame unit 100 on the back side and front frame unit 500 on the front side in the optical axis AX direction (here and hereinafter, the object side along the optical axis AX direction is defined as the front side, and the digital camera 1 side is defined as the back side). Sensor holder unit 300 is supported so as to be movable in the X-axis direction and the Y-axis direction in a plane (here and hereinafter, this plane is assumed a plane parallel to both the X-axis and the Y-axis in FIG. 2) perpendicular to optical axis AX (here and hereinafter, optical axis AX is assumed parallel to a Z-axis in FIG. 2). Also, sensor holder unit 300 is configured so as to be rotatable about optical axis AX by being moved so that moving amounts of sensor holder unit 300 in the Y-axis direction on one side in the X-axis direction and on the other side in the X-axis direction are different from each other.

Figure 4:
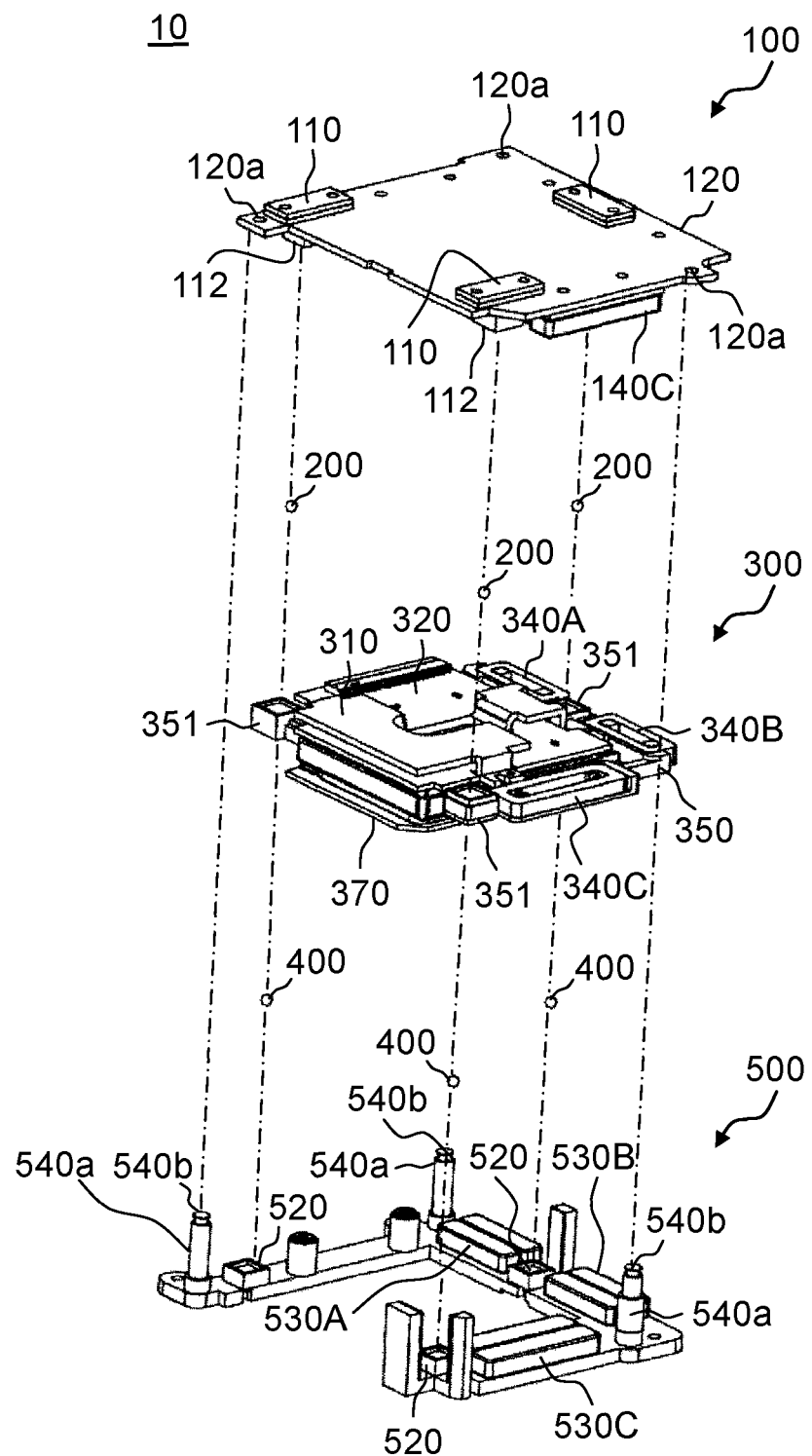
FIG. 4 is an exploded perspective view of the image stabilization mechanism.

FIG. 4 is an exploded perspective view of image stabilization mechanism 10. This perspective view shows a state in which components are exploded in the optical axis direction. The vertical direction in FIG. 4 is approximately coincided with the optical axis direction. Much the same is true on FIG. 5 to FIG. 8.

As shown in FIG. 4, image stabilization mechanism 10 has rear frame unit 100, first balls 200, sensor holder unit 300, second balls 400, and front frame unit 500. First balls 200 and second balls 400 are spherical bodies made of a ceramic. However, first balls 200 and second balls 400 may be made of any other material such as a metal or the like, as far as they have a favorable rolling property. Configurations of rear frame unit 100, sensor holder unit 300 and front frame unit 500 will be described in detail below.

Figure 5:
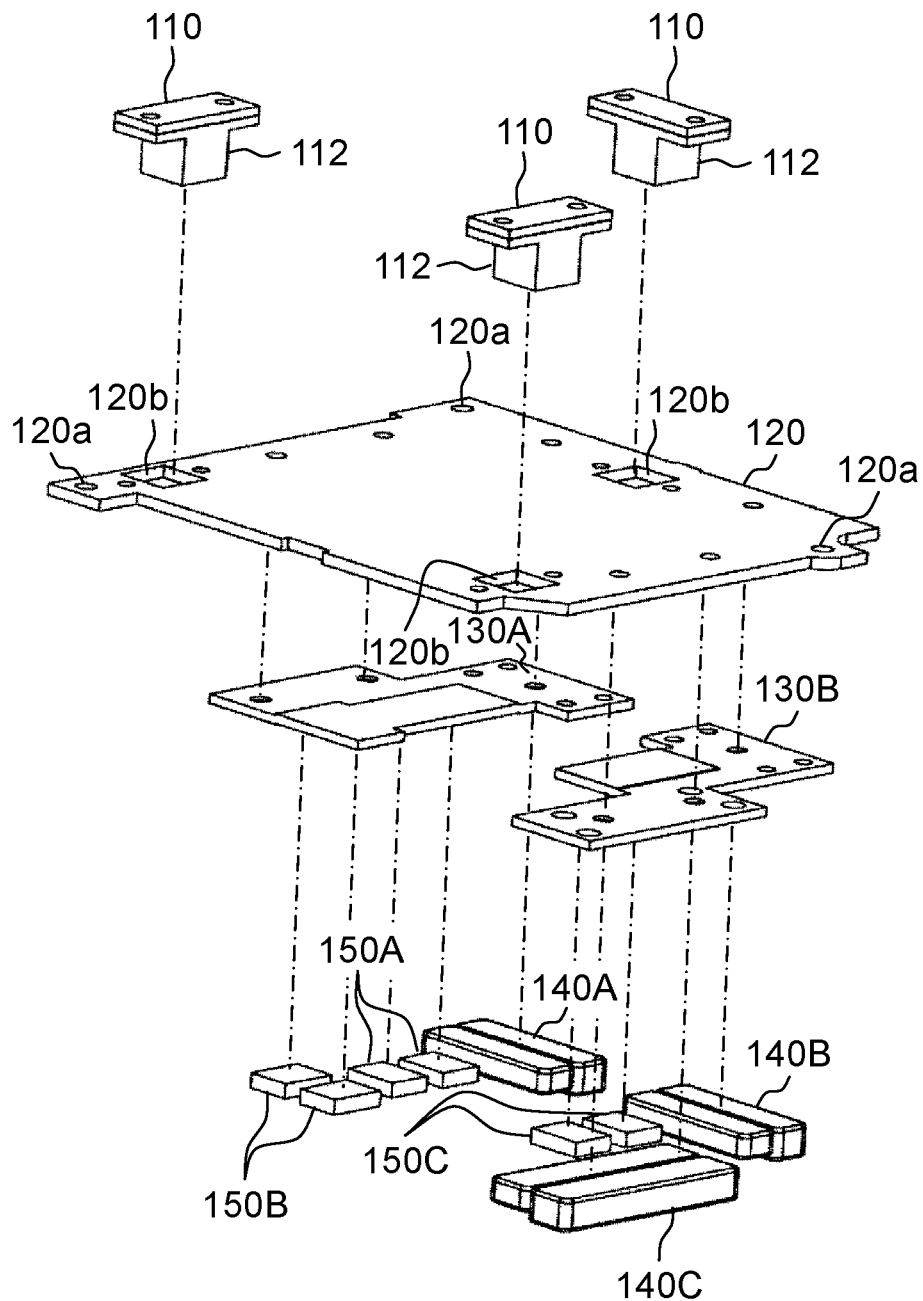
FIG. 5 is an exploded perspective view of a rear frame unit.

FIG. 5 is an exploded perspective view of rear frame unit 100.

As shown in FIG. 5, rear frame unit 100 has cylinder units 110, rear frame 120, yokes 130A and 130B, driving magnets 140A, 140B and 140C, and detecting magnets 150A, 150B and 150C.

Each of cylinder units 110 is configured by a cylinder mechanism. The set of cylinder units 110 is an example of a pressing mechanism.

Rear frame 120 is a plate-like member made of a metal. Rear frame 120 is an example of a first frame.

Yokes 130A and 130B are plate-like members made of iron.

Driving magnets 140A, 140B and 140C are prismatic members made of a magnetic material.

Detecting magnets 150A, 150B and 150C are plate-like members made of a magnetic material.

Cylinder units 110 of rear frame unit 100 are inserted into respective cylinder fixing through holes 120b formed on rear frame 120, and fixed to rear frame 120 with an adhesive and screws or the like. Yokes 130A and 130B are fixed to a front surface of rear frame 120 with an adhesive or the like. Driving magnet 140A and detecting magnets 150A and 150B are fixed to a front surface of yoke 130A with an adhesive or the like. Driving magnets 140B and 140C and detecting magnet 150C are fixed to a front surface of yoke 130B with an adhesive or the like.

Figure 6:
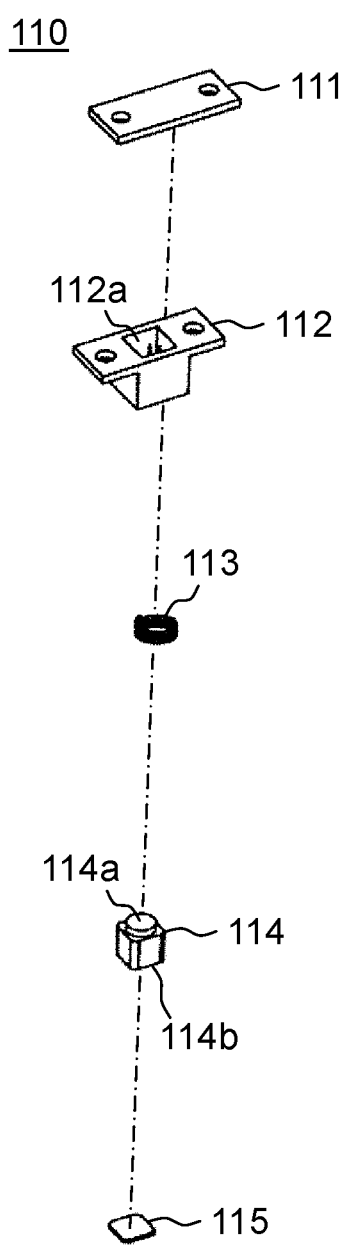
FIG. 6 is an exploded perspective view of a cylinder unit.

FIG. 6 is an exploded perspective view of one cylinder unit 110.

As shown in FIG. 6, cylinder unit 110 has retainer plate 111, cylinder 112, spring 113, piston 114, and slide plate 115.

Retainer plate 111 is a plate-like member made of a resin and a metal.

Cylinder 112 is an approximately rectangular cylindrical member made of a resin and having rectangular cylindrical piston housing 112a for housing piston 114.

Spring 113 is made of stainless steel. Spring 113 is an example of an urging member. In the present exemplary embodiment, spring 113 is configured by a coil spring.

Piston 114 is a prismatic member made of a resin and slidable within piston housing 112a.

Slide plate 115 is a plate-like member made of stainless steel. A surface of slide plate 115 is formed to be planar.

Retainer plate 111 is fixed to a back surface of cylinder 112 with an adhesive, a screw or the like to constitute a bottom surface of piston housing 112a. Slide plate 115 is fixed to piston surface 114b of piston 114 with an adhesive or the like. One end of spring 113 is fitted to spring fitting portion 114a of piston 114. Spring 113, piston 114 and slide plate 115 are housed in piston housing 112a of cylinder 112.

Figure 7:
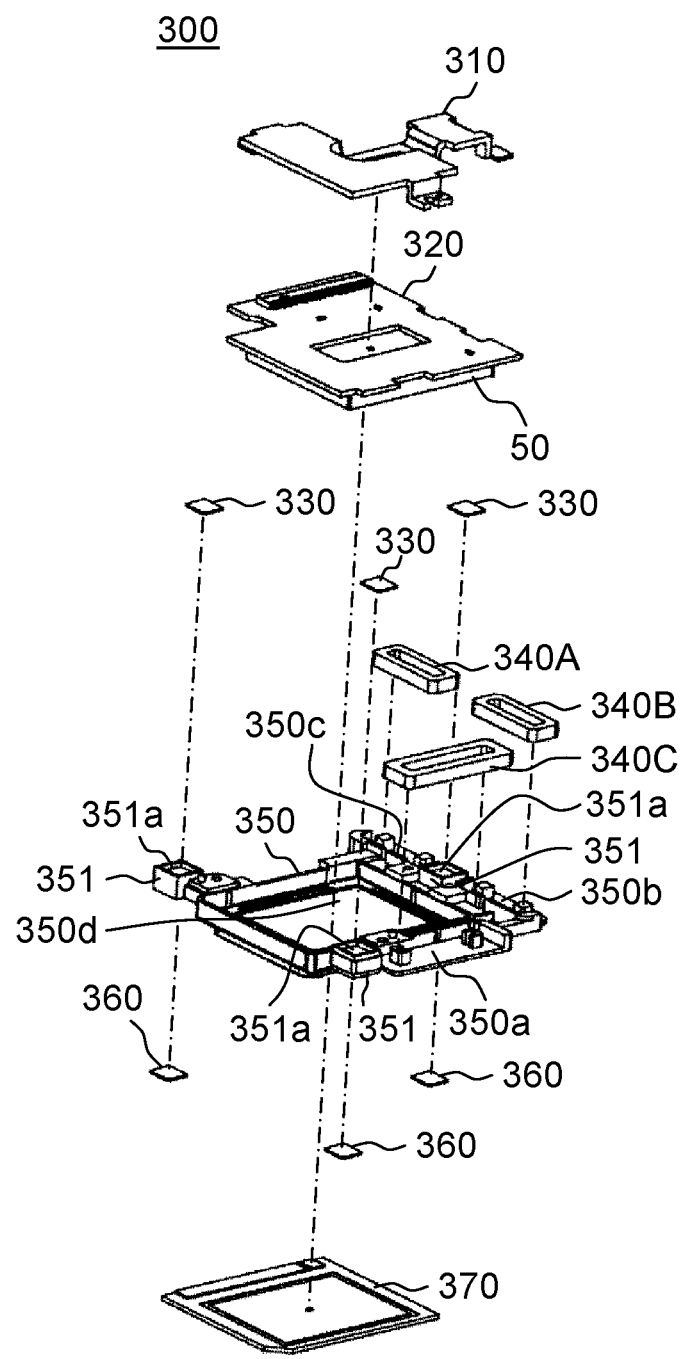
FIG. 7 is an exploded perspective view of a sensor holder unit.

FIG. 7 is an exploded perspective view of sensor holder unit 300.

As shown in FIG. 7, sensor holder unit 300 has heat dissipation plate 310, image sensor substrate 320, slide plates 330, coils 340A, 340B and 340C, sensor holder 350, slide plates 360, and protective glass 370. Sensor holder unit 300 is an example of a component holder.

Heat dissipation plate 310 is a plate-like member made of a metal having a large thermal conductivity, or a high heat dissipation property, such, for example, as copper or aluminum.

Image sensor substrate 320 is a substrate on which image sensor 50 is mounted.

Slide plates 330 are plate-like members made of stainless steel. Surfaces of slide plates 330 are configured to be planar.

As shown in FIG. 4, coils 340A, 340B and 340C are disposed so as to respectively overlap with driving magnets 140A (see FIG. 5), 140B (see FIG. 5) and 140C of rear frame unit 100, and with driving magnets 530A, 530B and 530C of later-described front frame unit 500 when viewed in the optical axis direction. When coils 340A, 340B and 340C are energized in the magnetic field of these magnets, a force acting to move sensor holder unit 300 in a plane perpendicular to the optical axis is generated by Fleming's rule. Controller 14 (see FIG. 1) controls the amounts of currents supplied to respective coils 340A, 340B and 340C so that an image blur on image sensor 50 (see FIG. 1) caused by a shake of the camera chassis is canceled. The amounts of the currents are determined based on the angular accelerations in the yaw direction, the pitch direction and the roll direction detected by angular acceleration sensors 11, 12 and 13 (see FIG. 1) and the accelerations in the X-axis direction and the Y-axis direction detected by acceleration sensor 15 (see FIG. 1).

As shown in FIG. 7, sensor holder 350 is a rectangular frame-like member made of a magnesium alloy.

Slide plates 360 are plate-like members made of stainless steel. Surfaces of slide plates 360 are configured to be planar.

Protective glass 370 is a transparent glass plate.

Image sensor substrate 320 is housed in sensor housing 350d of sensor holder 350. Heat dissipation plate 310 is disposed on the back side of image sensor substrate 320 so as to be in contact with a back surface of image sensor substrate 320, and fixed to sensor holder 350 with screws or the like. Coils 340A, 340B and 340C are respectively fixed to coil fixing portions 350a, 350b and 350c of sensor holder 350 with an adhesive or the like. Slide plates 330 are respectively fixed, with an adhesive or the like, to bottom surfaces of rear frame portions 351a of holding frame portions 351 provided on sensor holder 350. Slide plates 360 are respectively fixed, with an adhesive or the like, to bottom surfaces of front frame portions 351b (see FIG. 13) of holding frame portions 351 provided on sensor holder 350. Protective glass 370 is fixed to a front surface of sensor holder 350.

Figure 8:
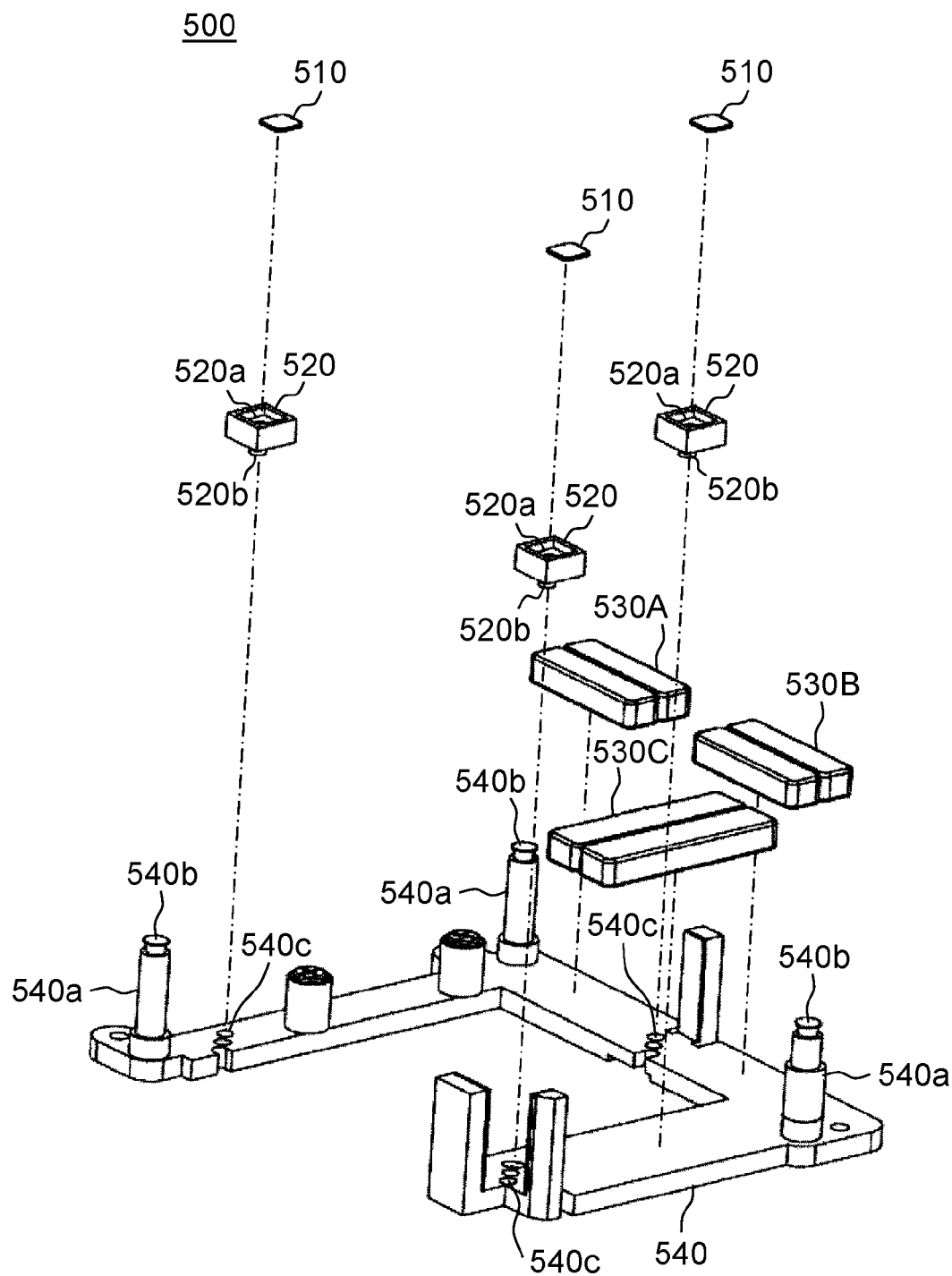
FIG. 8 is an exploded perspective view of a front frame unit.

FIG. 8 is an exploded perspective view of front frame unit 500.

As shown in FIG. 8, front frame unit 500 has slide plates 510, spacers 520, driving magnets 530A, 530B and 530C, and front frame 540.

Slide plates 510 are plate-like members made of stainless steel. Surfaces of slide plates 510 are configured to be planar.

Spacers 520 are frame-like members made of a resin.

Driving magnets 530A, 530B and 530C are prismatic members made of a magnetic material.

Front frame 540 is an approximately U-shaped plate member made of a metal. Front frame 540 has a plurality of holding members 540a each having fixing projection 540b formed on its end. Fixing projections 540b are respectively fitted to fixing through holes 120a (see FIG. 4) of rear frame 120 (see FIG. 4), so that rear frame 120 and front frame 540 are fixed to each other. Front frame 540 is an example of a second frame.

Slide plates 510 are respectively fixed to bottom surfaces of frame portions 520a of spacers 520 with an adhesive, a screw or the like. Spacers 520 are fixed to front frame 540 with an adhesive or the like in such a state that fixing projections 520b are fitted to spacer fixing holes 540c of front frame 540. Driving magnets 530A, 530B and 530C are fixed to a back surface of front frame 540 with an adhesive or the like.

Figure 9:
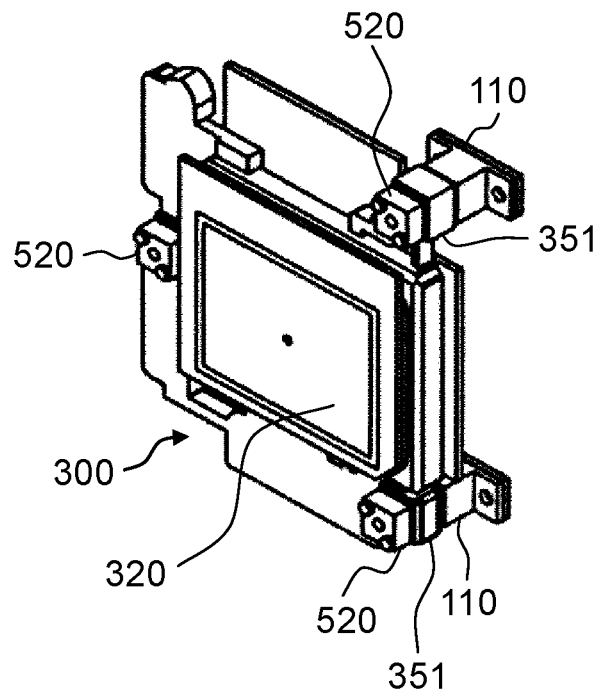
FIG. 9 is a perspective view of a front side of the sensor holder unit for explaining a support unit each being configured by a spacer and the cylinder unit.
Figure 10:
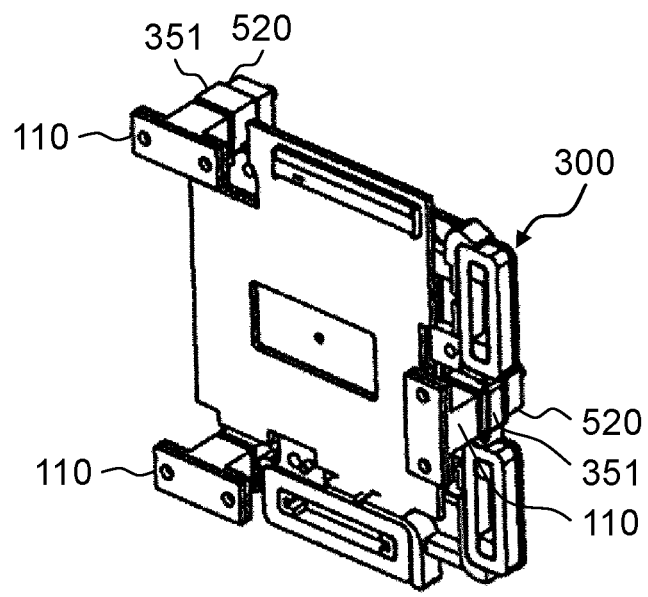
FIG. 10 is a perspective view of a back side of the sensor holder unit for explaining the support units each being configured by the spacer and the cylinder unit.
Figure 11:
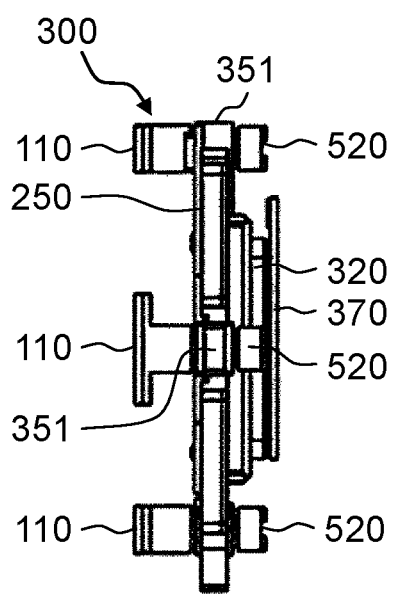
FIG. 11 is a side view of the sensor holder unit for explaining the support units each being configured by the spacer and the cylinder unit.

FIG. 9 is a perspective view of a front side of sensor holder unit 300 for explaining support units configured by three spacers 520 and three cylinder units 110. FIG. 10 is a perspective view of a back side of sensor holder unit 300 for explaining the support units configured by three spacers 520 and three cylinder units 110. FIG. 11 is a side view of sensor holder unit 300 for explaining the support units configured by three spacers 520 and three cylinder units 110.

As shown in FIG. 9 to FIG. 11, sensor holder unit 300 is supported at three points, or at three holding frame portions 351 in a state being supported from the front and back sides in the optical axis direction by three spacers 520 of front frame unit 500 and three cylinder units 110 of rear frame unit 100 (see FIG. 4).

Figure 12:
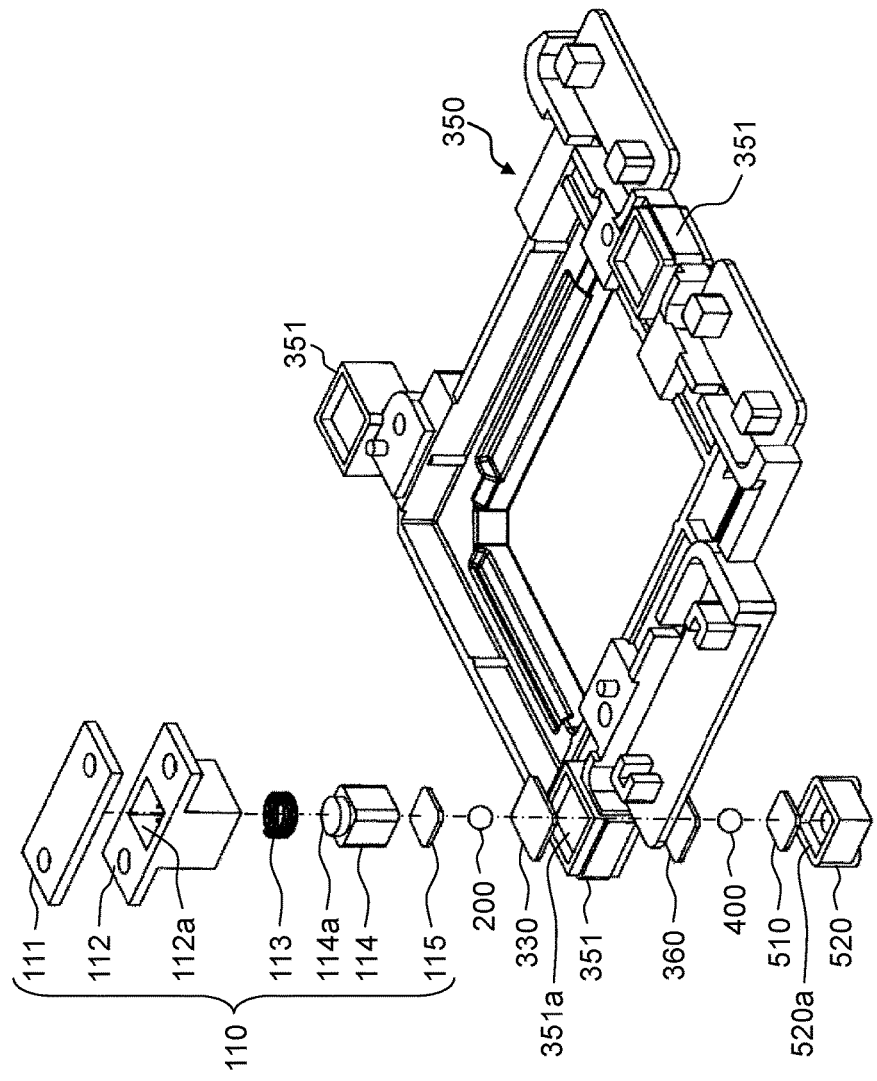
FIG. 12 is an exploded perspective view for explaining the support units of the sensor holder unit (only one support unit is shown)
Figure 13:
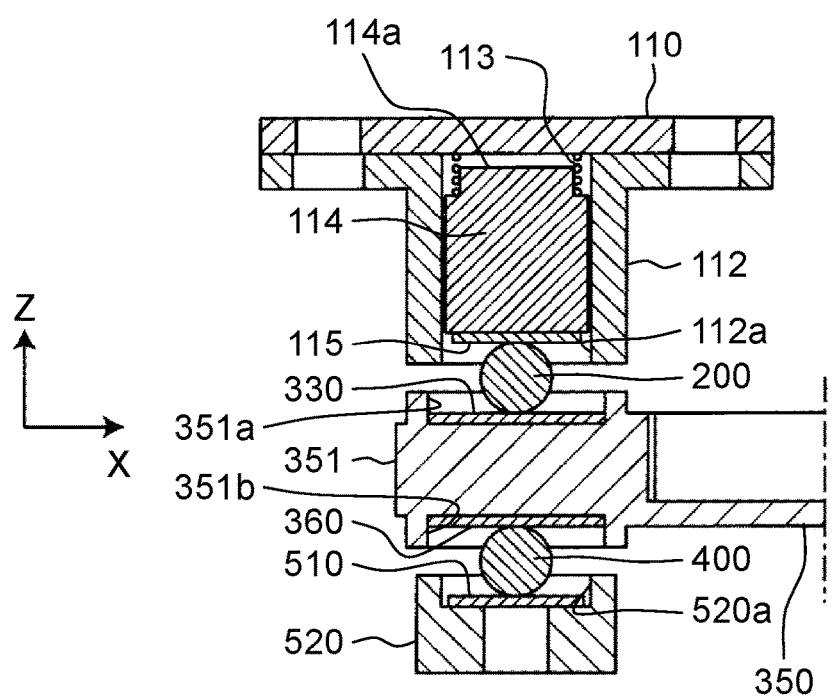
FIG. 13 is a sectional view for explaining the support units of the sensor holder unit.

FIG. 12 is an exploded perspective view for explaining the support units of sensor holder unit 300 (see FIG. 4). FIG. 13 is a sectional view for explaining the support units of sensor holder unit 300 (see FIG. 4). In FIG. 12, only one support unit is shown for convenience.

As shown in FIG. 12 and FIG. 13, piston 114 and spring 113 are housed in piston housing 112a of cylinder 112. Piston 114 is housed so as to be slidable in a direction parallel to the optical axis within piston housing 112a. In the state in which piston 114 and spring 113 are housed in piston housing 112a, spring 113 is in a compressed state by contacting at its one end with pressing plate 111 and at its the other end with spring fitting portion 114a of piston 114. In other words, an urging force from spring 113 is acting on piston 114. Accordingly, piston 114 presses first ball 200 against slide plate 330 of holding frame portion 351 of holder unit 300 (see FIG. 4) through slide plate 115. This pressing force is transmitted from holding frame portion 351 of sensor holder unit 300 to slide plate 510 of spacer 520 through slide plate 360 and second ball 400, and received by front frame unit 500 (see FIG. 4). As a result, first ball 200 is in point-contact with slide plate 115 and slide plate 330, and second ball 400 is in point-contact with slide plate 360 and slide plate 510. Also, sensor holder unit 300 is held in a state being supported from the front and back sides in the optical direction by first balls 200 and second balls 400.

2. Operations and Actions

Digital camera 1 detects angular accelerations in the yaw direction, the pitch direction and the roll direction respectively detected by angular acceleration sensors 11, 12 and 13, and accelerations in the X-axis direction and the Y-axis direction detected by acceleration sensor 15. Controller 14 of digital camera 1 controls the magnitudes of the currents supplied to coils 340A, 340B and 340C of sensor holder unit 300 of image stabilization mechanism 10 based on the detected accelerations in the X-axis direction and the Y-axis direction to move image sensor 50 in a plane perpendicular to the optical axis so that an image blur on image sensor 50 caused by a camera shake is canceled.

At this time, piston 114 possessed by cylinder unit 110 provided in rear frame unit 100 is urged forward in the optical axis direction due to an urging force of spring 113 acting in the direction to press piston 114 against first ball 200. In this condition, according to image stabilization mechanism 10 of the present exemplary embodiment, sensor holder unit 300 is held in a state of being supported from the front side and the back side in the optical axis direction by cylinder unit 110 and front frame unit 500 through first ball 200 and second ball 400. Accordingly, rattling of sensor holder unit 300 in the optical direction can be suppressed.

Also, since slide plates 115, 330, 360 and 510 are provided in the present exemplary embodiment, first ball 200 and second ball 400 are in point-contact with these slide plates. Accordingly, first ball 200 and second ball 400 receive small driving resistances when they are rolling. Consequently, sensor holder unit 300 can move smoothly in rapid response.

Also, vibration of sensor holder unit 300 in the Z-axis direction is absorbed due to a sliding resistance caused when piston 114 slides in cylinder 112. In other words, a damper effect can be obtained.

Also, since spring 113 is housed in piston housing 112a, the direction of the urging force by spring 113 is always in parallel to the optical axis direction. Here, reference is made to FIG. 15 which is a schematic diagram for explaining an example manner of supporting a sensor holder in the conventional image stabilization mechanism. In the conventional image stabilization mechanism, a displacement of moving member 2350 relative to fixed member 2540 in a plane perpendicular to the optical axis to the position indicated by broken lines causes tension spring 2600 to expand, so that moving member 2350 is urged in the direction to return to the reference state indicated by solid lines due to restoring force Fr in the direction perpendicular to the optical axis. For example, if driving force Fm1 is applied to moving member 2350, the actual driving force is reduced due to restoring force Fr acting in the opposite direction to driving force Fm1. As another example, if driving force Fm2 is applied to moving member 2350, the actual driving force is increased due to restoring force Fr acting in the same direction as driving force Fm2. As a result, such a case sometimes occurs that moving member 2350 cannot be moved to an appropriate position.

Also, when tension spring 2600 is converging to the reference position indicated by the solid line, a resonance of tension spring 2600 is caused due to the expansion and contraction of tension spring 2600. As a result, it sometimes becomes difficult to appropriately move moving member 2350 in a particular frequency range.

However, the image stabilization mechanism in accordance with the present exemplary embodiment, which does not use a tension spring like tension spring 2600, is free from generation of restoring force Fr in the direction perpendicular to the optical axis, and is also free from generation of a resonance due to expansion and contraction of tension spring 2600. Consequently, the problems as described above can be solved.

Figure 15:
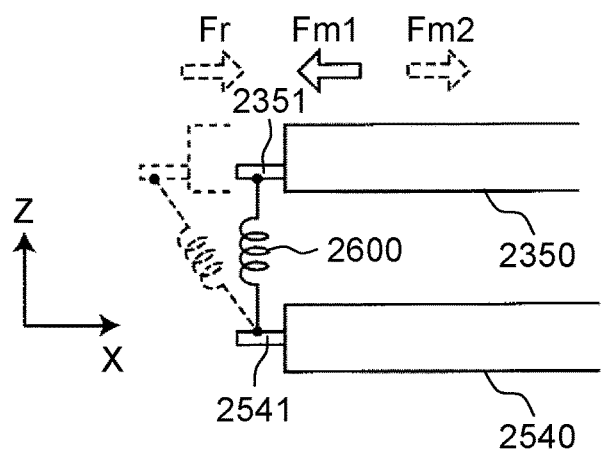
FIG. 15 is a schematic diagram for explaining an example manner of supporting a sensor holder in a conventional image stabilization mechanism.

Further, in the conventional image stabilization mechanism, as shown in FIG. 15, spring hanging portions 2351 and 2541 for hanging tension spring 2600 protrude in the X-axis direction and the Y-axis direction. As a result, there is a problem that the dimensions of the image stabilization mechanism in the X-axis direction and the Y-axis direction tend to increase. However, this problem also can be solved according to the present exemplary embodiment, which does not use tension spring 2600, and thus does not require such portions like spring hanging portions 2351 and 2541.

Second Exemplary Embodiment

Figure 14:
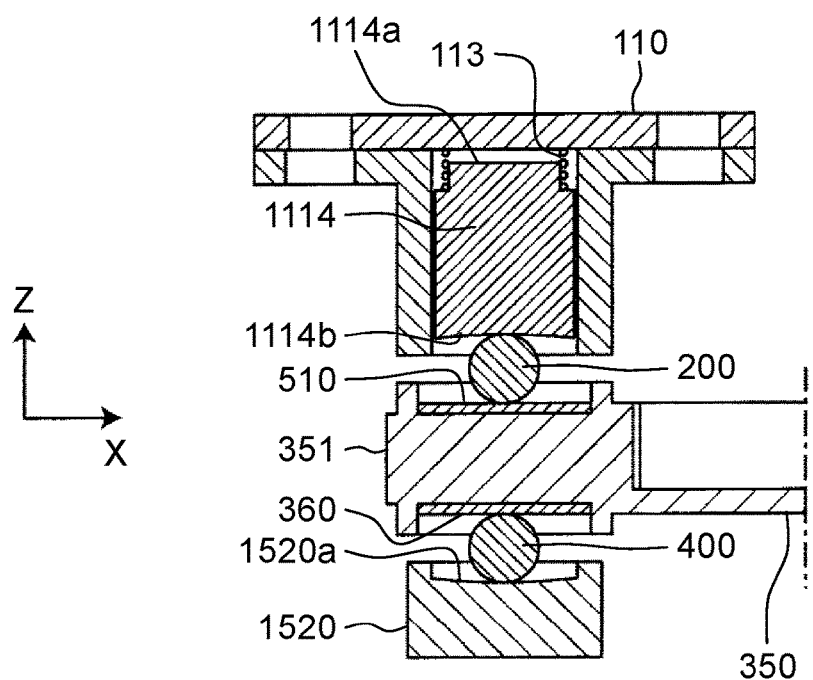
FIG. 14 is a sectional view for explaining support units of a sensor holder unit in an image stabilization mechanism in accordance with a second exemplary embodiment.

FIG. 14 is a sectional view for explaining support units of sensor holder unit 300 (see FIG. 4) in an image stabilization mechanism in accordance with a second exemplary embodiment.

As shown in FIG. 14, in the image stabilization mechanism in accordance with the second exemplary embodiment, piston surface 1114b, which is possessed by cylinder unit 110 as a contact surface contacting with first ball 200, is formed to be a recessed bowl-shape surface. The image stabilization mechanism in accordance with the second exemplary embodiment is different, in this point, from image stabilization mechanism 10 in accordance with the first exemplary embodiment, in which the surface of slide plate 115, or a contact surface possessed by cylinder unit 110 as a surface contacting with first ball 200, is formed to be a planar surface. Accordingly, the above-mentioned different point will hereinafter be described in detail, and description on the other configurations will be simplified or omitted. Like portions which have the same configurations as those of the first exemplary embodiment will be indicated by like reference marks.

In the second exemplary embodiment, any slide plates are not attached to piston 1114 and spacer 1520, and each of piston surface 1114b of piston 1114 and a bottom surface of frame portion 1520a of spacer 1520 has a gradually recessed bowl-like shape. In other words, cylinder unit 110 has a recessed bowl-like contact surface (piston surface 1114b) which is in contact with first ball 200. Also, front frame unit 500 (see FIG. 4) has a recessed bowl-like contact surface (the bottom surface of frame portion 1520a) which is in contact with second ball 400.

Each of these bowl-like contact surfaces is formed such that a deepest point is located on an axis of piston 1114 (here and hereinafter, an axis that is parallel to the optical axis and passes through a center of piston surface 1114b). Also, sensor holder unit 300 is configured such that a center of image sensor 50 (see FIG. 1) is located on the optical axis when a center of first ball 200 and a center of second ball 400 are located on the axis of piston 1114.

Piston 1114 is made of a resin. One end of spring 113 is fitted to spring fitting portion 1114a of piston 1114.

When sensor holder unit 300 moves in the X-axis direction and the Y-axis direction, the center of each of first ball 200 and second ball 400 deviates from the axis of piston 1114. In this state, forces of returning the centers of first ball 200 and second ball 400 back to the respective positions on the axis of piston 1114 act on first ball 200 and second ball 400 from piston surface 1114b and the bottom surface of frame portion 1520a, respectively. Therefore, each of first ball 200 and second ball 400 is positioned substantially on the axis of piston 1114. This reduces the possibility that first ball 200 and second ball 400 come in contact with the inner circumferential surface of piston housing 112a and an inner circumferential surface of frame portion 1520a of spacer 1520, respectively. Accordingly, the driving resistances of first ball 200 and second ball 400 during rolling can be reduced, so that sensor holder unit 300 can be moved smoothly in rapid response.

Advantageous Effects and Others

Image stabilization mechanism 10 in accordance with each of the first and second exemplary embodiments includes: sensor holder unit 300 (a component holder) that holds image sensor 50 (an optical component); rear frame 120 (a first frame) disposed on one side of sensor holder unit 300 in an optical axis direction; front frame 540 (a second frame) disposed on the other side of sensor holder unit 300 in the optical axis direction and fixed to rear frame 120 (the first frame); first balls 200 rollably inserted between rear frame 120 (the first frame) and sensor holder unit 300; second ball 400 rollably inserted between front frame 540 (the second frame) and sensor holder unit 300; and cylinder unit 110 (a pressing mechanism) provided on rear frame 120 (the first frame) to press first balls 200 against sensor holder unit 300.

Cylinder unit 110 (the pressing mechanism) has cylinder 112 provided on rear frame 120 (the first frame) so that its axial direction is parallel to the optical axis direction, piston 114 movably provided in cylinder 112, and spring 113 (an urging member) that urges piston 114 toward sensor holder unit 300.

First ball 200 is disposed between an end surface of piston 114 and sensor holder unit 300.

In this configuration, first ball 200 between rear frame 120 and sensor holder unit 300 can be urged against sensor holder unit 300 by piston 114, so that rattling of sensor holder unit 300 can be restricted. Accordingly, the tension spring as used in the conventional image stabilization mechanism is not necessary, so that such a restoring force is not generated that urges sensor holder unit 300 toward the direction to return sensor holder unit 300 to the reference position in a plane perpendicular to the optical axis. Consequently, it is possible to appropriately move sensor holder unit 300 in a plane perpendicular to the optical axis.

In the second exemplary embodiment, cylinder unit 110 has bowl-like recessed piston surface 1114b that is in contact with first ball 200 (a contact surface contacting with first ball 200).

In this configuration, when sensor holder unit 300 moves in the X-axis direction and the Y-axis direction, the center of first ball 200 deviates from the axis of piston 1114, so that a force of returning the center of first ball 200 to a position on the axis of piston 1114 acts on first ball 200. Accordingly, the center of first ball 200 is positioned substantially on the axis of piston 1114, so that it is possible to prevent first ball 200 from contacting the inner circumference surface of piston housing 112a. Accordingly, it is possible to reduce the driving resistance of first ball 200 during rolling, and consequently to move sensor holder unit 300 smoothly in rapid response.

In the second exemplary embodiment, front frame unit 500 has a bowl-like recessed bottom surface of frame portion 1520a that is in contact with second ball 400 (a contact surface contacting with second ball 400).

In this configuration, when sensor holder unit 300 moves in the X-axis direction and the Y-axis direction, the center of second ball 400 deviates from the axis of piston 1114, so that a force of returning the center of second ball 400 to a position on the axis of piston 1114 acts on second ball 400. Accordingly, the center of second ball 400 is positioned substantially on the axis of piston 1114, so that it is possible to prevent second ball 400 from contacting the inner circumference surface of frame portion 1520a of spacer 1520. Accordingly, it is possible to reduce the driving resistance of second ball 400 during rolling, and consequently to move sensor holder unit 300 smoothly in rapid response.

In the second exemplary embodiment, cylinder unit 110 has bowl-like recessed piston surface 1114b that is in contact with first ball 200 (the contact surface contacting with first ball 200). However, piston surface 1114b may be made planar, and, instead, sensor holder unit 300 may have bowl-like recessed slide plate 510 that is in contact with first ball 200 (a contact surface contacting with first ball 200). As another modification, both cylinder unit 110 and sensor holder unit 300 may have bowl-like recessed contact surfaces that are in contact with first ball 200. In other words, at least one of cylinder unit 110 and sensor holder unit 300 may have a bowl-like recessed contact surface that is in contact with first ball 200.

Further, in the second exemplary embodiment, the contact surface possessed by cylinder unit 110 as a surface to be in contact with first ball 200 is piston surface 1114b, and piston surface 1114b has a bowl-like recessed shape. However, such contact surface may not be limited to piston surface 1114b. For example, the piston surface of the piston may be made planar, and a slide plate formed to have a recessed bowl-like shape may be fixed to the piston surface with an adhesive or the like. In this case, the recessed bowl-like main surface formed on the slide plate becomes the contact surface possessed by the cylinder unit as a surface to be in contact with first ball 200.

As described hereinabove, there is provided digital camera 1 (an imaging device) with image stabilization mechanism 10 according to each of the first and second exemplary embodiment.

Other Exemplary Embodiments

In the above-described exemplary embodiments, cylinder unit 110 is provided on rear frame 120. However, the cylinder unit may be provided on front frame 540.

In the above-described exemplary embodiments, coil spring 113 is exemplified as an urging member of the present disclosure. However, the urging member may not be limited to the coil spring. The urging member may be any member as far as it is capable of urging the piston toward the sensor holder, and may, for example, be a plate spring, a rubber, a magnet, or a compressed gas.

In the above-described exemplary embodiments, rear frame 120, front frame 540 and sensor holder 350 are made of a magnesium alloy. However, these components may be made of another metal material or resin material, such, for example, as a glass-filled polycarbonate.

The image stabilization optical system used in the above-described exemplary embodiments is a system of moving image sensor 50 in a plane perpendicular to the optical axis. However, the image stabilization optical system may not be limited to this system. The present disclosure is applicable to such an image stabilization mechanism that uses a system of moving a lens in a plane perpendicular to the optical axis as the image stabilization optical system. In this case, a lens holder that holds the lens used for the image stabilization corresponds to the component holder of the present disclosure.

In the above description, exemplary embodiments have been described as examples of techniques according to the present disclosure. For the purpose of the description, the accompanying drawings and the detailed description have been provided.

Accordingly, the components shown in the drawings and described in the detailed description may include not only components that are essential to solve the problems, but also components that are for exemplifying the above-described techniques and thus are not essential to solve the problems. Therefore, it should not immediately recognize that such non-essential components are essential merely for the reason that they are shown in the drawings or described in the detailed description.

Also, since the above-described exemplary embodiments are for exemplifying the techniques according to the present disclosure, various modifications, substitutions, additions or omissions may be made within the scope of the appended claims and equivalents thereof.

The present disclosure is applicable to digital video cameras, digital still cameras, mobile telephones with a camera function, smartphones with a camera function, and the like.

What is claimed is:

1. An image stabilization mechanism comprising:
   a component holder configured to hold an optical component;
   a first frame on a first side of the component holder in an optical axis direction;
   a second frame on a second side of the component holder in the optical axis direction, the second frame being fixed to the first frame;
   a first support unit;
   a second support unit; and
   a third support unit,
   wherein each of the first support unit, the second support unit, and the third support unit includes:
   a first ball rollably positioned between the first frame and the component holder;
   a second ball rollably positioned between the second frame and the component holder; and
   a pressing mechanism on the first frame, the pressing mechanism being configured to press the first ball against the component holder,
   wherein the first ball supports a first side of the component holder in the optical axis direction,
   wherein the second ball supports a second side of the component holder in the optical axis direction,
   wherein the pressing mechanism has:
   a cylinder positioned on the first frame so that an axial direction of the cylinder is parallel to the optical axis direction;
   a piston movably positioned in the cylinder; and
   an urging member configured to urge the piston toward the component holder,
   wherein the cylinder has a recess between an end surface of the piston and an end surface of the cylinder,
   wherein the component holder has a recess,
   wherein the first ball is between the end surface of the piston and the component holder such that a first portion of the first ball is in the recess of the cylinder and a second portion of the first ball is in the recess of the component holder, and
   wherein movement of the first ball is limited by the recess of the cylinder and the recess of the component holder.

2. The image stabilization mechanism according to claim 1, wherein at least one of the pressing mechanism and the component holder has a bowl-shaped recessed contact surface that is in contact with the first ball.

3. An imaging device comprising the image stabilization mechanism according to claim 1.

4. The image stabilization mechanism according to claim 1, wherein the component holder is configured to slide together with the first ball and the second ball rolling, so that the component holder is movable, relative to the first frame and the second frame, in three or more directions parallel to a plane perpendicular to the optical axis direction.

5. The image stabilization mechanism according to claim 1, wherein the recess of the cylinder is an edged recess.

6. The image stabilization mechanism according to claim 1, wherein the recess of the cylinder is a bowl-shaped recess.

7. The image stabilization mechanism according to claim 1, wherein the recess of the component holder is an edged recess.

8. The image stabilization mechanism according to claim 1, wherein the recess of the component holder is a bowl-shaped recess.

* * * * *